H. V. WELCH.
CONTACT PROCESS AND APPARATUS FOR PRODUCING SULFURIC ACID.
APPLICATION FILED NOV. 22, 1916.
1,284,167.
Patented Nov. 5, 1918.
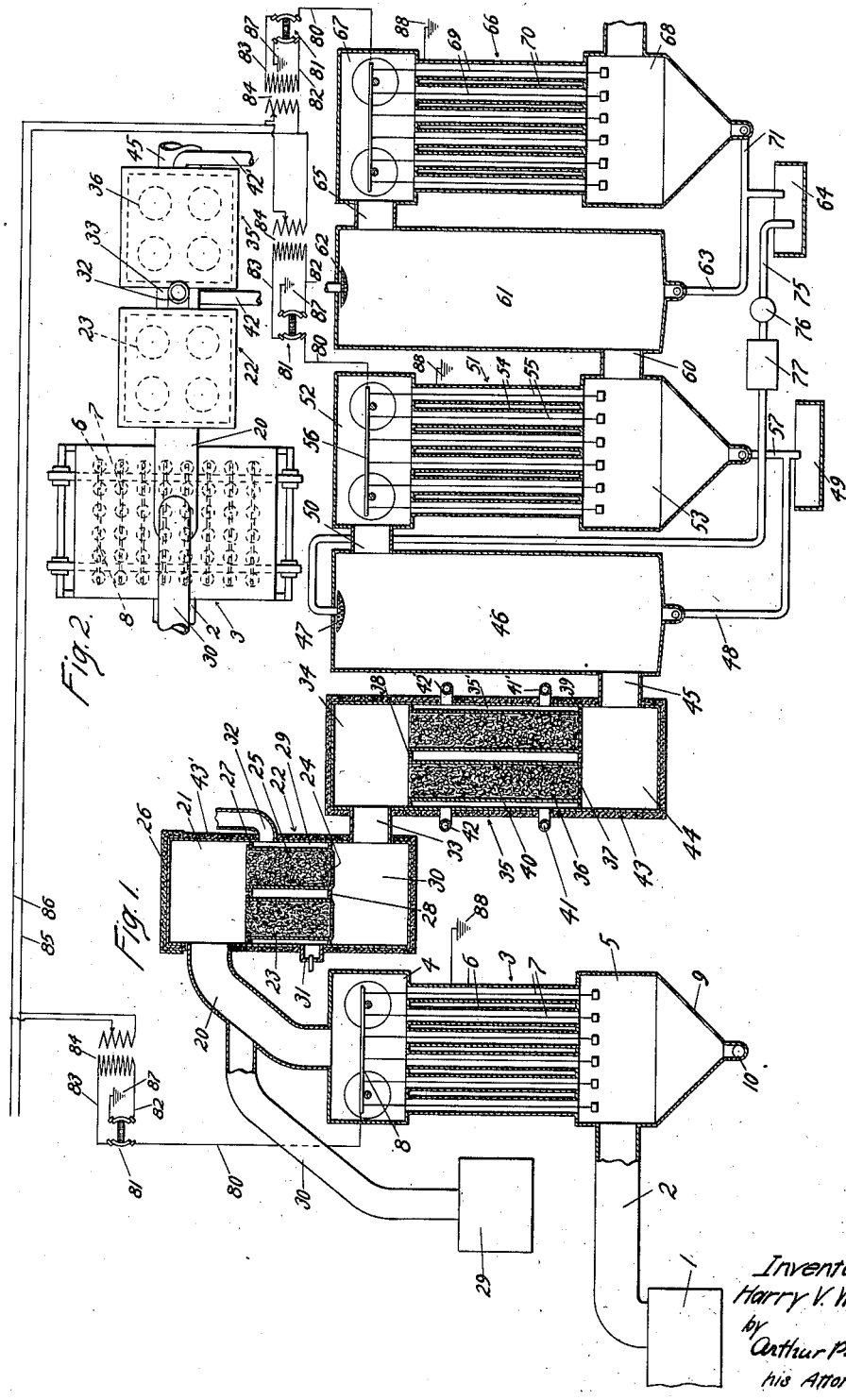

UNITED STATES PATENT OFFICE.

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

CONTACT PROCESS AND APPARATUS FOR PRODUCING SULFURIC ACID.

1,284,167.  Specification of Letters Patent.  Patented Nov. 5, 1918.

Application filed November 22, 1916. Serial No. 132,774.

*To all whom it may concern:*

Be it known that I, HARRY V. WELCH, a citizen of the United States, residing at Los Angeles, in the county of Los Angeles and State of California, have invented a new and useful Contact Process and Apparatus for Producing Sulfuric Acid, of which the following is a specification.

This invention relates to the production of sulfuric acid by the catalyzing action, in a mixture of sulfur dioxid and air, of ferric oxid or equivalent catalyzing agent. The mixture of sulfur dioxid and air may be produced in a sulfur burning furnace or may constitute the waste gases from a roaster or smelter. The production of sulfuric acid from roaster or smelter gases is of great potential importance, in view of the enormous amount of sulfur dioxid now produced as a waste product in connection with copper roasting and smelting, but so far such production has not been carried out so extensively as it might be on account of the great expense of constructing and maintaining the necessary apparatus. The use of platinum as a catalyzer is practically prohibited in such cases, by the excessive cost of such metal. Catalyzers of the ferric oxid class are however well adapted for such uses on account of their cheapness, and the relatively low efficiency of conversion is not of serious importance in such cases, as the material which fails of conversion is only a waste product of the smelting or roasting operation. A more serious difficulty is that of maintaining the catalyzing plugs or masses in operative condition. In general, there is a considerable amount of suspended material in the form of fine particles of dust or fume, carried over with the gases from the furnace or other source of sulfur dioxid and, especially in the case of the waste gases from roasters or smelters, the amount of suspended matter so carried over is such as to interfere seriously with the proper operation of the catalyzing mass, by causing clogging, fouling and channeling to such an extent as to require frequent renewals. This purely mechanical difficulty has in fact so far prevented successful application of processes of this kind in connection with roaster or smelter gases. Clearing the gases of such suspended matter by any of the usual processes, such as scrubbing, settling or filtering, is out of the question. Scrubbing and filtering are both impracticable as they involve great reduction of temperature of the gases, and as catalysis by ferric oxid requires a fairly high temperature, it is essential to economy to pass the gases to the catalyzer with as little cooling as possible. Settling chambers are impracticable on account of the great volume of gas to be treated.

The main object of this invention is to provide for producing sulfuric acid or sulfur trioxid by a contact process using a contact mass of the ferric oxid type, in such manner that such contact mass may be substantially permanent, thereby avoiding the expense, labor and loss of time caused by renewal thereof.

Another object of the invention is to provide for carrying out the process under the most economical conditions possible, and particularly to conserve as far as possible the heat of the incoming gases so as to reduce to minimum the heating required for bringing the contact mass to the optimum temperature for conversion.

Another object of the invention is to increase the efficiency of conversion. In this connection I have found that in some cases the efficiency of the ferric oxid as a catalyzer increases continually with use for a considerable period of time (several months) and by so carrying out the operation that such contact mass is permanent, or substantially so, I am enabled to obtain the greatest possible efficiency.

The objects above set forth are attained, in my invention, by subjecting the gases, carrying sulfur dioxid together with oxygen and with suspended matter, to the action of an electrical field, whereby the suspended matter is precipitated and removed from the gases before they reach the contact mass, and whereby the gases are allowed to retain substantially all the heat with which they come from the furnace, smelter or roaster, thereby providing substantially clean gas for the action of the contact mass without the waste of energy which would be involved in cooling the gases to a temperature suitable for cleaning by scrubbing or filtration and then reheating.

Another object of this invention is to provide for effective collection and recovery of the sulfuric acid or sulfur trioxid formed in the process. When the sulfur trioxid is brought into contact with water to form sulfuric acid, a large amount of fume is generally formed. My invention provides for complete recovery of all the sulfuric acid by electrical precipitation of such fumes.

The accompanying drawings illustrate an apparatus suitable for carrying out my invention, and referring thereto:

Figure 1 is a diagrammatic vertical section of the apparatus.

Fig. 2 is a plan view of a portion of the apparatus, showing the first electrical treater and the two contact chambers.

1 indicates any means for supplying sulfur dioxid together with air, and may be a sulfur burning furnace, or it may be a roaster or smelter, in which case the sulfur dioxid is contained in the waste gases. A pipe 2 conducts the gases from roaster or smelter 1 to the inlet header 5 of an electrical precipitator or treater 3, which may be of any usual or suitable type, being here shown as of the tubular electrode type and comprising top and bottom headers 4 and 5, pipes or tubes 6 extending between said top and bottom headers 4 and 5, and wires 7 hung from an insulated support 8 and extending down through pipes 6. Said wires and pipes are adapted to act as discharge and collecting electrodes respectively, being provided with suitable energizing means, as hereinafter described, for maintaining a high potential difference between said electrodes, to produce an electrical field therebetween. The material precipitated by the action of such electrical field collects on pipes or collecting electrodes 6, and may either be allowed to fall or be dislodged from time to time by suitable knocking or rapping means, not shown, falling into a hopper or receiving means 9 provided at the bottom of bottom header 5, suitable means 10 being provided for removing the material so collected.

From the top header 4 of treater 3, a pipe or conduit 20 leads to the upper header or chamber 21 of a preliminary contact chamber 22. Suitable means $29^a$ are preferably provided for supplying hot air through flue or pipe $30^a$ to pipe 20, so that such hot air is introduced into the gases passing from treater 3 to contact chamber 22. In said chamber 22 are mounted conduits or catalyzer tubes 23, provided with perforated bottom plates 24, so as to allow passage of gas therethrough but to retain within said catalyzer tubes plugs or beds of catalyzer, such as ferric oxid, indicated at 25. Conduits or catalyzer tubes 23 are preferably removably mounted in chamber 22, and a removable cover 26 may be provided for said chamber, so that the tubes may be conveniently lifted out for renewal of the catalyzer if necessary. Partitions 27 and 28 close the space 29 around and between the tubes 23 at the top and bottom thereof, so as to hold said tubes in place and to cause all the gas to pass through the tubes to get from the upper chamber 21 to a lower chamber 30. A burner or other suitable means 31 may be provided for maintaining the plugs or beds of catalyzer at the proper temperature. For example, said means may be adapted to supply hot air or other heating gases to the space 29, and exit means 32 may be provided for carrying off such gases from such space.

A pipe or conduit 33 leads from said lower chamber 30 to the upper header 34 of the main contact chamber 35, provided with catalyzer tubes 36 having perforated bottom plates 37, said tubes being permanently mounted in said chamber and supported by partitions 38 and 39 at the top and bottom thereof, and containing plugs, beds or masses of catalyzer, such as ferric oxid, indicated at 40. Pipe connections 41, 41' and 42, 42' are provided for conducting hot air or gases at different temperatures to and from the space 35' around and between tubes 36 and between partitions 38 and 39, at different levels between said partitions, so as to maintain the desired conditions of temperature at different levels in the beds or masses of catalyzer 40. Chamber 35 may be provided with an outer casing 43 of heat insulating material in order to reduce to a minimum the amount of heat required to maintain the catalyzer at the desired temperature. Similar insulating means indicated at 43' may be provided for the first contact chamber 22. The contact chamber 22 is relatively short and the contact mass therein is comparatively short and of small volume, so as to be readily removable without undue expense, this contact mass serving mainly as a filtering agent for removal of substantially all the last traces of suspended material. The contact chamber 35, on the other hand, is relatively long, and the contact mass therein is also relatively long and of relatively large volume.

The lower header 44 of chamber 35 is connected by pipe or conduit 45 to the lower part of a humidifying or absorbing chamber 46, provided with means 47 for introducing a spray of finely divided particles of dilute sulfuric acid to the upper part of said chamber, and with means 48 for conducting any liquid collecting on the bottom of the chamber to suitable storage means 49.

A pipe or conduit 50 leads from the upper part of chamber 46 to the top header 52 of another electrical precipitator or treater 51, which may be of any usual or suitable type, being for example, similar to precipitator 3, and having top and bottom headers 52 and 53, pipes or collecting electrodes 54 extending between said headers, wires or discharge electrodes 55 suspended within said pipes from an insulated support 56, and suitable energizing means maintaining a high potential difference between said electrodes so as to produce an electrical field therebetween. Means 57 are provided for drawing off from the bottom of treater 51 the material precipitated therein and conducting the same to storage means 49.

A pipe 60 conducts the gases from lower header 53 of precipitator 51 to the lower part of a second humidifying or absorbing chamber 61, which may be similar to chamber 46, being provided with means 62 for introducing steam or a spray of finely divided particles of water to the upper part of said chamber, and with means 63 for conducting any liquid collecting on the bottom thereof to another storage means 64.

From the upper part of chamber 61 a pipe 65 leads to the top header 67 of another electrical precipitator 66 of any suitable type, having for example, top and bottom headers 67 and 68, wires or discharge electrodes 69, pipes or collecting electrodes 70, and suitable energizing means similar to precipitator 51. Means 71 are also provided for drawing off the material precipitated in this treater and conducting the same to storage means 64.

A pipe 75 and pump 76 may be provided for conducting all or part of the dilute acid collected in storage means 64 to the spraying means 47 for chamber 46, suitable means 77 being provided for heating the acid if desired before introducing it into said chamber.

The energizing means for the treaters 3, 51 and 66 may be as follows:

The respective discharge electrodes may be connected by wires 80 to rectifiers 81, which are connected by wires 82 and 83 to the high tension side of step-up transformers 84, the primary windings of which are connected to an alternating current circuit 85, 86, rectifiers 81 and the respective collecting electrodes being grounded as indicated at 87 and 88 to complete the circuit.

Electrical treaters 3, 51 and 66 may be of any other suitable type than that shown, for example, the discharge electrodes may be formed as rigid rods or of any common form and the collecting electrodes may be plates instead of pipes. The materials used in the construction of chamber 50, pipe 55, treater 57, pipes 52 and 69, and any other parts of the apparatus which are subject to contact with acid, may be any suitable acid resisting material, such as lead, its alloys, glazed porcelain or earthenware, enameled metal, etc.

The process as carried out in the above described apparatus is essentially as follows:

The gases coming from the burner, roaster or smelter 1, and containing sulfur dioxid, together with excess air, and also containing impurities or other substances liable to clog or interfere with the operation of the beds of catalyzer, are conducted by pipe 2 to the electrical precipitator 3, wherein they are subjected to the action of an electrical field in passing through pipes 6. Substantially all dust, fume or other solid or liquid impurities are thereby precipitated, fall to the bottom of the treater and are removed through means 10. In general, a further quantity of oxygen will be required in addition to that coming with the sulfur dioxid from the roasters, etc., and such additional quantity of oxygen may be furnished through pipe 30ª and is preferably heated so that the resulting mixture enters the contact chambers at proper temperature.

The substantially clean gases, including the supplementary air supply, then pass through pipe or conduit 20 into the preliminary contact chamber 22, and through the catalyzer tubes 23, where under the catalytic action of the beds 25 of ferric oxid or other suitable catalyzer, part of the sulfur dioxid reacts with some of the oxygen of the air to form sulfur trioxid according to the following equation:

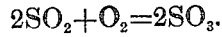

$$2SO_2 + O_2 = 2SO_3.$$

Inasmuch as it is impossible to entirely clear the gases of all impurities in treater 3, a slight amount of dust, etc. will be carried over and deposited within the beds of catalyzer, tending to reduce their efficiency by clogging the pores and coating the surfaces of the same. It has been found that after most of the dust, etc., has been removed by electrical action, by far the greater part of the residual dust, etc., carried over and entering the beds of catalyzer, is deposited within a comparatively short distance after entering such beds, and practically all the dust may therefore be collected in the first few feet of catalyzing material. By making the beds or masses of catalyzer 25 in this preliminary chamber of proper length I am enabled to collect practically all the impurities in said treater and to admit only gas which is almost absolutely clean to the main contact chamber 34, and by making the catalyzer tubes in said preliminary chamber easily removable, I am enabled to readily renew whenever necessary the catalyzer contained therein without disturbing the beds of catalyzer 37 in the main contact chamber 34.

On the other hand, as the dust or suspended material has been almost absolutely removed from the gases before they pass to the main contact mass 37, the latter may be used for a long time and is substantially or relatively permanent compared to the usual practice in contact apparatus, or compared to the renewable contact mass 25.

In chamber 34 the clean gases are subjected to the further catalytic action of the beds of catalyzer therein and the formation of sulfur trioxid according to the above equation proceeds until equilibrium is reached, or until about 75 per cent. of the sulfur dioxid is converted. The fact that these plugs or beds of catalyzing material may be made substantially permanent, on account of the preliminary cleaning of the gases entering the same, is of advantage, in that it decreases the cost of maintenance, by eliminating the cost of material and labor required for renewal of the contact mass, and it is also of advantage in that it increases the efficiency of the conversion. I have found that the efficiency of conversion, with a ferric oxid contact mass, consisting of dead-roasted cinder from smelters. increases progressively with time for over a month, and by making the mass substantially permanent, it is possible to operate at a higher efficiency than where the mass is renewed so frequently as to prevent it from approaching its maximum catalyzing power.

Such cinder, being reduced to a suitable state of division for use in the contact mass, forms a granular or porous mass capable of efficient action as a filter and readily renewable when it becomes clogged, and as only a small part of the total contact mass is subject to frequent renewal, the loss of material is minimized, and the loss of heat due to heating of newly introduced material is also reduced to a minimum. The fact that all but the last traces of suspended material is taken out by the electrical precipitator before the gases reach the first, filtering, contact mass, is of importance, as it enables said mass to operate effectively as a filter for a much longer time than if it had to collect all the dust, thereby further reducing the expense for material and for heat.

In carrying out the above described operation in the permanent contact chamber, (constituted by the pipes), I prefer to maintain the gases in the first or upper part of said chamber, at a relatively high temperature, either by heating the gases or the excess air supplied thereto, to a suitably high temperature or by applying heat externally to the chamber, and to maintain the final part of the contact chamber at a lower temperature, by suitably controlling the temperature of the gases passing through the lower part of the space around the pipes. Thus, by maintaining the gases during the first part of the catalyzing action in such chamber, at a temperature of say 700° to 800° C., the initial velocity of conversion is made extremely rapid (the velocity being approximately doubled for every 10° C. rise of temperature), and the resulting release of a large quantity of heat (due to the exothermic reaction $SO_2+O=SO_3+22600$ cal) serves to heat the gases to the active stage for the remainder of the passage through the contact mass. Then, by causing the temperature of the gases to be lower during the latter part of the catalyzing operation, the gases may be maintained at a temperature, say 625° C., which is most desirable for conversion. In other words, the operation is first carried on at a temperature giving rapid conversion of a considerable percentage of the $SO_2$ and then at a lower temperature giving slower but more efficient conversion of some of the remaining $SO_2$. As one way of maintaining this temperature relation I may provide for admitting atmospheric air through one of the lower pipes, allowing such air to be heated by contact with the catalyzer tubes or pipes, and to ascend into the upper part of the space 35' wherein it is further heated by hot gases supplied through inlet pipe, or by suitable burner means.

The gases issuing from chamber 35 and containing the sulfur trioxid produced in said chamber, enter the lower part of humidifying or absorbing chamber 46, where they are brought into contact with the finely divided particles of dilute $H_2SO_4$, supplied through means 47. The acid supplied to this chamber is in such quantity and of such concentration as to cause the acid mist formed in said chamber to be of the desired concentration, and it is introduced at such temperature (say 200° C.) as will permit the formation only of substantially concentrated acid. Under these conditions a portion of the $SO_3$ entering the chamber will be absorbed and a mist will be formed consisting essentially of particles of concentrated sulfuric acid, as any particles of less concentration which may be formed will be immediately disssociated on account of the high temperature. Some of these particles will be of sufficient mass to fall to the bottom of the chamber, whence they are conducted by pipe 48 to storage means 49. The particles thus removed from suspension are those which have had the longest time of contact with the SO₃, due to having passed throughout the entire length of chamber 46, and they are therefore more concentrated than the particles in the upper part of the chamber. The gases entering the chamber are therefore first brought into contact with the most concentrated acid and then with acid of steadily diminishing concentration, which causes a steady absorption to take place throughout the chamber. Part of the concentrated acid mist thus formed and not falling to the bottom of this chamber is carried over by pipe 50 to the electrical precipitator 51, where, under the action of the electrical field produced therein, it is precipitated and collects at the bottom of said treater. From here, the concentrated acid is carried off by pipe 57, which may as shown, lead to the same tank as does pipe 48, or it may lead to a separate tank, so as to enable the collection of acid of two different concentrations, one from the humidifying chamber 46, and one from the precipitator 51.

The remaining gases containing some SO₃ unabsorbed in the first humidifying chamber, are conducted from the bottom header of precipitator 51 to the lower part of the second humidifying chamber 61, where such remaining portion of SO₃ is brought into contact with finely divided water particles, which are introduced through means 62 at such temperature (say 100° C.) as will allow the formation of relatively dilute sulfuric acid in the form of a mist. Any particles falling to the bottom of this chamber are conducted by pipe 63 to storage means 64, while the mist issuing from the top of said chamber is conducted by pipe 65 to the final electrical precipitator 66, where it is substantially precipitated by the electrical field therein. The acid thus precipitated and falling to the bottom of said precipitator is carried by pipe 71 to storage means 64. The acid collected in said storage means is returned, in whole or in part, through pipe 75 to the spraying means 47 for chamber 46, by means of pump 76, being raised to the proper temperature by heating means 77.

The humidifying and precipitating operations for the absorption of SO₃ may be carried out in any desired number of stages, the acid mist formed in each humidifying chamber being precipitated in the succeeding precipitator, and in each case all or part of the acid so precipitated may be returned to the humidifying chamber preceding the one in which it was formed, thus producing acid of progressively increasing concentration.

As a catalyzer I may use any of the well known agents for that purpose, such for example, as ferric oxid, either alone or mixed with other substances, as in dead roasted cinder, above mentioned, or the oxids of other metals of the iron group, or the sulfates of some of such metals.

These and equivalent catalyzers are herein designated "catalyzers of the ferric oxid class."

Various modifications may be made in the construction and arrangement of the apparatus without departing from my invention. For example, the hot air supplying the excess of oxygen may be introduced before the gases pass through the first electrical precipitator, or, if desired, such air may be introduced between the first and second catalyzing chambers. Furthermore, the heating of the contact mass may be controlled by any other suitable means, for example, by a counter current arrangement.

It will be understood that the illustrations of the apparatus in the accompanying drawings is diagrammatic, no attempt being made to show the detail construction and relative dimensions of the various parts, which will be determined according to ordinary practice, in any particular plant, by the special conditions therein existing.

What I claim is:

1. The process of making sulfuric acid from hot gases containing sulfur dioxid, oxygen and suspended non-gaseous material, which consists in removing substantially all the suspended material from the hot gases, then passing the gases, while still hot, in contact with a substantially permanent contact mass of the ferric oxid class, and continuing such operation until the contact mass attains maximum efficiency of conversion.

2. The process of making sulfuric acid from hot gases containing sulfur dioxid, oxygen and suspended non-gaseous material, which consists in removing substantially all the suspended material from the hot gases, then passing the gases, while still hot, in contact with a substantially permanent contact mass consisting of material of the ferric oxid class the conversion efficiency of which increases with time of exposure to the hot gases, and continuing such operation until the contact mass attains maximum efficiency of conversion.

3. The process of making sulfuric acid from hot gases containing sulfur dioxid, oxygen and suspended non-gaseous material which consists in removing substantially all the suspended material from the gases, while they are still hot, and then passing the gases, while still hot, in contact with a substantially permanent contact mass, consisting of ferric oxid.

4. The process of making sulfuric acid from hot gases containing sulfur dioxid, oxygen and suspended non-gaseous material, which consists in subjecting such gases to the action of a high tension unidirectional electrical field to precipitate suspended material therefrom, then passing the hot gases through a filter mass capable of resisting the heat of said gases, and then passing the gases, while still hot, in contact with a mass of catalyzing material.

5. The process of making sulfuric acid from hot gases containing sulfur dioxide, oxygen and non-gaseous suspended material, which consists in subjecting such gases to the action of a high tension unidirectional electrical field, to precipitate suspended material from the gases, then passing the hot gases through a mass of heat resistance material, to filter out substantially all the remaining suspended material, and then passing the gases while still hot, through a hot contact mass of catalytic material, and renewing said mass of filtering material without disturbing said mass of catalytic material.

6. The process of making sulfuric acid from hot gases containing sulfur dioxide, oxygen and non-gaseous suspended material, which consists in subjecting such gases to the action of a high tension unidirectional electrical field, to precipitate suspended material from the gases, then passing the hot gases through a relatively small porous mass of catalytic material, and then through a relatively large porous mass of catalytic material, and renewing said relatively small mass so as to maintain it in effective filtering condition without disturbing the said relatively large mass.

7. The process of making sulfuric acid which consists in burning sulfur-bearing material so as to produce hot gases containing sulfur dioxid, oxygen and suspended non-gaseous material, subjecting such gases to the action of a high tension unidirectional electrical field to precipitate suspended material, subsequently passing the gases in contact with solid catalyzing material to produce sulfur trioxid, then introducing aqueous liquid spray to cool and absorb the sulfur trioxid and form sulfuric acid mist, and precipitating such mist by the action of a high tension electrical field.

8. The process of making sulfuric acid which consists in burning sulfur bearing material so as to produce hot gases containing sulfur dioxid and suspended non-gaseous material, precipitating suspended material from the hot gases by the action of a high tension unidirectional electrical field, introducing hot air into the gases, and then passing the gases through a contact mass of catalytic material.

9. In the contact process of making sulfuric acid, the method of converting sulfur trioxid into sulfuric acid, which consists in passing the gases containing such sulfuric trioxid in contact with finely divided particles of relatively dilute sulfuric acid at a relatively high temperature to partially absorb said sulfur trioxid and form a mist of relatively concentrated sulfuric acid, subjecting the mist so formed to the action of an electrical field to precipitate such mist, then passing the remaining gases in contact with finely divided particles of water at a relatively lower temperature to absorb the remainder of the sulfur trioxid and form a mist of relatively dilute sulfuric acid, then subjecting the mist so formed to the action of an electrical field to precipitate such mist, and utilizing the dilute sulfuric acid so formed in the first of said cooling and absorbing operations.

10. An apparatus for making sulfuric acid, comprising electrical precipitating means adapted to receive the reacting gases and to precipitate suspended material therefrom, a catalyzing means comprising a relatively short and easily renewable contact mass, and a relatively long and relatively permanent contact mass, and means for passing the gases from said precipitating means successively through said relatively short and relatively long contact masses.

11. An apparatus for making sulfuric acid comprising electrical precipitating means, provided with means for passing the reacting gases therethrough, and with means for producing an electrical field in such gases to precipitate suspended material from such gases, means for supplying hot air to said gases, and catalyzing means connected to receive such gases with the hot air and comprising a permanent contact mass and means for maintaining such contact mass at the proper temperature.

12. An apparatus for making sulfuric acid, comprising an electrical precipitator adapted to receive the reacting gases and to precipitate suspended material therefrom, a catalyzing means provided with a contact mass and with means for maintaining proper temperature thereof, and with connections for passing the gases from said electrical precipitator through said contact mass, means for humidifying the gases from said catalyzing means in a plurality of stages, at successively lower temperatures, and a plurality of electrical precipitating means adapted to receive the gases and to precipitate the fume therefrom after each humidifying operation.

13. In the contact process of making sulfuric acid, the method of converting sulfur trioxid into sulfuric acid and collecting the latter, which consists in disseminating a liquid spray through a moving column of gases containing sulfur trioxide, thereby absorbing the sulfur trioxide and producing a sulfuric acid mist, and subjecting the mist so formed to the action of an electrical field to effect precipitation thereof.

14. In the contact process of making sulfuric acid, the method of converting sulfur trioxid into sulfuric acid and collecting the latter, which consists in disseminating a liquid spray of relatively dilute sulfuric acid through a moving column of gases containing sulfur trioxid, thereby absorbing the sulfur trioxid and producing a sulfuric acid mist, and subjecting the mist so formed to the action of an electrical field to effect precipitation thereof.

In testimony whereof I have hereunto set my hand, at Los Angeles, California, this 17th day of November, 1916.

HARRY V. WELCH.